United States Patent
Iwai

(10) Patent No.: US 8,436,950 B2
(45) Date of Patent: May 7, 2013

(54) CONTROL KEY UNIT FOR TELEVISION RECEIVER

(75) Inventor: Akio Iwai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 756 days.

(21) Appl. No.: 12/503,882

(22) Filed: Jul. 16, 2009

(65) Prior Publication Data

US 2010/0044201 A1   Feb. 25, 2010

(30) Foreign Application Priority Data

Aug. 20, 2008  (JP) ................. 2008-211260

(51) Int. Cl.
*H04N 5/64*  (2006.01)
*H05K 7/00*  (2006.01)

(52) U.S. Cl.
USPC .......................... 348/836; 361/781

(58) Field of Classification Search .............. 348/725; 361/781; *H04N 7/12, 5/44*
See application file for complete search history.

(56) References Cited

U.S. PATENT DOCUMENTS

| | | | |
|---|---|---|---|
| 5,455,743 A | 10/1995 | Miyajima | |
| 5,573,317 A | 11/1996 | Cavanaugh et al. | |
| 5,737,039 A * | 4/1998 | Lopez et al. | 348/836 |
| 5,742,359 A | 4/1998 | Han | |
| 2009/0168321 A1* | 7/2009 | Kataoka et al. | 361/679.22 |

FOREIGN PATENT DOCUMENTS

| | | |
|---|---|---|
| JP | 03-067425 A | 3/1991 |
| JP | 07-141961 A | 6/1995 |

* cited by examiner

*Primary Examiner* — Richard Torrente
(74) *Attorney, Agent, or Firm* — Global IP Counselors

(57) ABSTRACT

A control key unit for a television receiver includes a rectangular wiring board, a key switch and a frame. The frame is configured to be attached to a cabinet of the television receiver and supports the wiring board. The frame is integrally formed as a one-piece, unitary member. The frame includes a front panel, a clamping section, a lengthwise positioning section and a lateral positioning section. The front panel has a push operated key top overlying the key switch. The clamping section clamps the wiring board in a thickness direction of the wiring board. The clamping section positions the wiring board in the thickness direction. The lengthwise positioning section positions the wiring board in a lengthwise direction of the wiring board. The lateral positioning section positions the wiring board in a width direction of the wiring board.

5 Claims, 4 Drawing Sheets

CONTROL KEY UNIT FOR TELEVISION RECEIVER

CROSS-REFERENCE TO RELATED APPLICATIONS

This application claims priority to Japanese Patent Application No. 2008-211260, filed on Aug. 20, 2008. The entire disclosure of Japanese Patent Application No. 2008-211260 is hereby incorporated herein by reference.

BACKGROUND OF THE INVENTION

1. Field of the Invention

The present invention generally relates to a control key unit. More specifically, the present invention relates to a control key unit for a television receiver.

2. Background Information

A conventional liquid crystal television receiver has a cabinet and a control key unit. The cabinet has a front cabinet and a rear cabinet. The front cabinet is rectangular when viewed from the front. The rear cabinet is coupled to the front cabinet. The control key unit includes a plurality of key tops. The key tops stick out from openings of the front cabinet. The openings are formed at a plurality of locations in a side panel on one side of the front cabinet, and are aligned vertically. The key tops are pressed by the user to set various modes. The key tops include a main power button, channel changing buttons, volume adjusting buttons, an external power switchover button, setup buttons, and other such necessary control buttons.

The control key unit is attached to the side panel of the front cabinet. The control key unit further includes a vertically oriented rectangular wiring board and a vertically oriented frame. A plurality of key switches is installed on the wiring board in a vertical alignment.

With the control key unit, the wiring board is attached to the frame. The key tops are integrally molded with the frame from resin. The key switches are mounted on the wiring board, and are disposed on the back of the key tops, respectively.

With the control key unit, the wiring board is temporarily positioned in a lengthwise direction and a width direction of the wiring board by the action of positioning protrusions that stick out from the frame. Then, the wiring board is fastened with attachment screws to the frame at a plurality of places (three places, for example). When this constitution is employed, the wiring board is positioned not only in the lengthwise direction and the width direction, but also in a thickness direction of the wiring board, by the positioning protrusions and the attachment screws. Because of the need to employ this attachment structure, the necessary number of screw holes and positioning holes are formed passing through the wiring board at the required places.

With the control key unit, the wiring board is attached to the frame. The control key unit is further attached to the side panel of the front cabinet by using attachment screws. The attachment screws fasten attachment tabs provided at both ends of the frame in the lengthwise direction of the frame to bosses provided to the front cabinet.

Meanwhile, there has been proposed another structure for attaching a wiring board to a housing of an electrical device. With the structure, a switch (e.g., key switch) is mounted on the wiring board. The switch is pressed by a control button. Furthermore, the two ends of the wiring board are inserted into a pair of U-shaped fixing tabs. Moreover, a plurality of hook-shaped support tabs is provided to the housing, and is engaged with the wiring board, thereby preventing the wiring board from coming loose from the fixing tabs (see Japanese Laid-Open Patent Application Publication No. H7-141961, for example).

Also, with further another structure, a wiring board on which a tactile switch is mounted is attached with a single screw to a button chassis having an integral push button. The wiring board is positioned by fitting a single stabilizing pin provided to the button chassis into an insertion hole in the wiring board (see Japanese Laid-Open Patent Application Publication No. H3-674425, for example).

However, with the conventional structure in which the wiring board is screwed down, not only is the components cost higher because of the need for using attachment screws, but the assembly process is more complicated because the time-consuming screw-fastening work has to be carried out. Thus, it is difficult to improve productivity.

Also, with the conventional structure in which the two ends of the wiring board are inserted into the fixing tabs, and the wiring board is held in place by the support tabs, when warping, bending, or other deformation occurs in the wiring board, there is no action to correct the deformation. Accordingly, the warping, bending, or other deformation remains even after attaching the wiring board. Furthermore, if this happens, the operation of the switches mounted on the wiring board by pressing the push buttons will be unstable, or the tactile feedback to the user will be inconsistent when the push buttons are pressed. As a result, it is difficult to increase the operational quality of the electrical device.

In view of the above, it will be apparent to those skilled in the art from this disclosure that there exists a need for an improved control key unit. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a control key unit for a television receiver with which there is no need to use attachment screws.

In accordance with one aspect of the present invention, a control key unit for a television receiver includes a rectangular wiring board, a key switch and a frame. The key switch is disposed on the wiring board and electrically coupled to the wiring board. The frame is configured to be attached to a cabinet of the television receiver and supports the wiring board. The frame is integrally formed as a one-piece, unitary member. The frame includes a front panel, a clamping section, a lengthwise positioning section and a lateral positioning section. The front panel has a push operated key top overlying the key switch. The clamping section clamps the wiring board in a thickness direction of the wiring board. The clamping section positions the wiring board in the thickness direction with respect to the frame. The lengthwise positioning section positions the wiring board in a lengthwise direction of the wiring board with respect to the frame. The lengthwise direction is perpendicular to the thickness direction. The lateral positioning section positions the wiring board in a width direction of the wiring board with respect to the frame. The width direction is perpendicular to both the thickness direction and the lengthwise direction.

With the control key unit of the present invention, it is possible to provide a control key unit for a television receiver with which there is no need to use attachment screws.

These and other objects, features, aspects and advantages of the present invention will become apparent to those skilled in the art from the following detailed descriptions, which, taken in conjunction with the annexed drawings, disclose a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from these disclosures that the following descriptions of the preferred embodiment of the present invention is provided for illustration only and not for the purpose of limiting the invention as defined by the appended claims and their equivalents.

Figure 6:
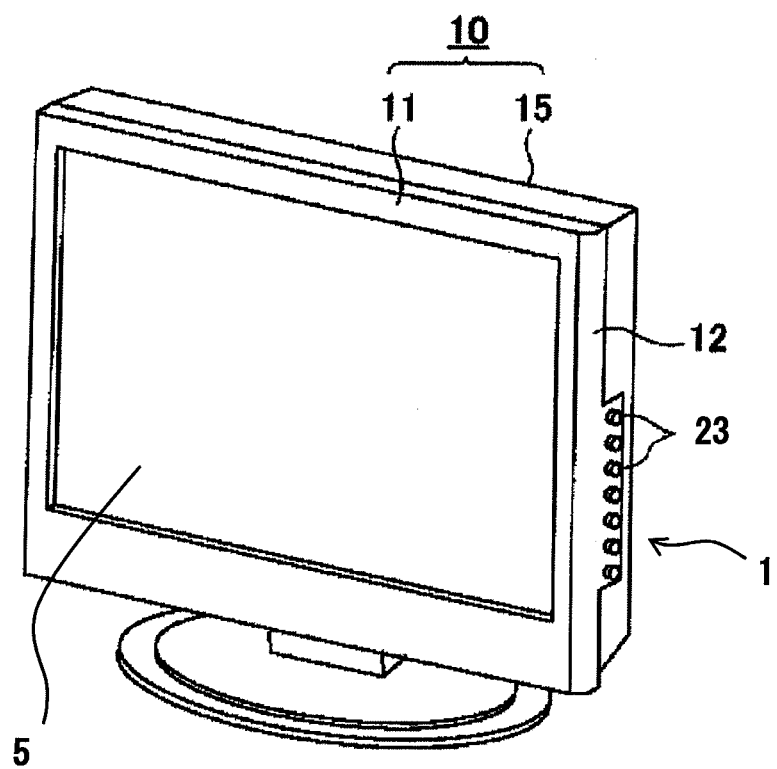
FIG. 6 is a perspective view of a liquid crystal television receiver having the control key unit illustrated in FIG. 1.

FIG. 6 is a perspective view of a liquid crystal television receiver. The liquid crystal television receiver has a liquid crystal module 5, a cabinet 10 and a control key unit 1. The liquid crystal module 5 includes a liquid crystal panel to display image. The cabinet 10 has a front cabinet 11 and a rear cabinet 15, and houses the liquid crystal module 5 within an inside space defined by the front cabinet 11 and the rear cabinet 15. The front cabinet 11 is rectangular when viewed from the front. The rear cabinet 15 is coupled to a rear side of the front cabinet 11.

As shown in FIGS. 1 to 4, the control key unit 1 includes a frame 20, a wiring board 30 and a plurality of key switches 40. The frame 20 is a resin molding. The frame 20 is vertically oriented. The wiring board 30 is rectangular and vertically oriented. The key switches 40 are mounted on the wiring board 30, and are electrically coupled to the wiring board 30. The key switches 40 are arranged in lengthwise alignment at a plurality of places on the wiring board 30.

Figure 1:
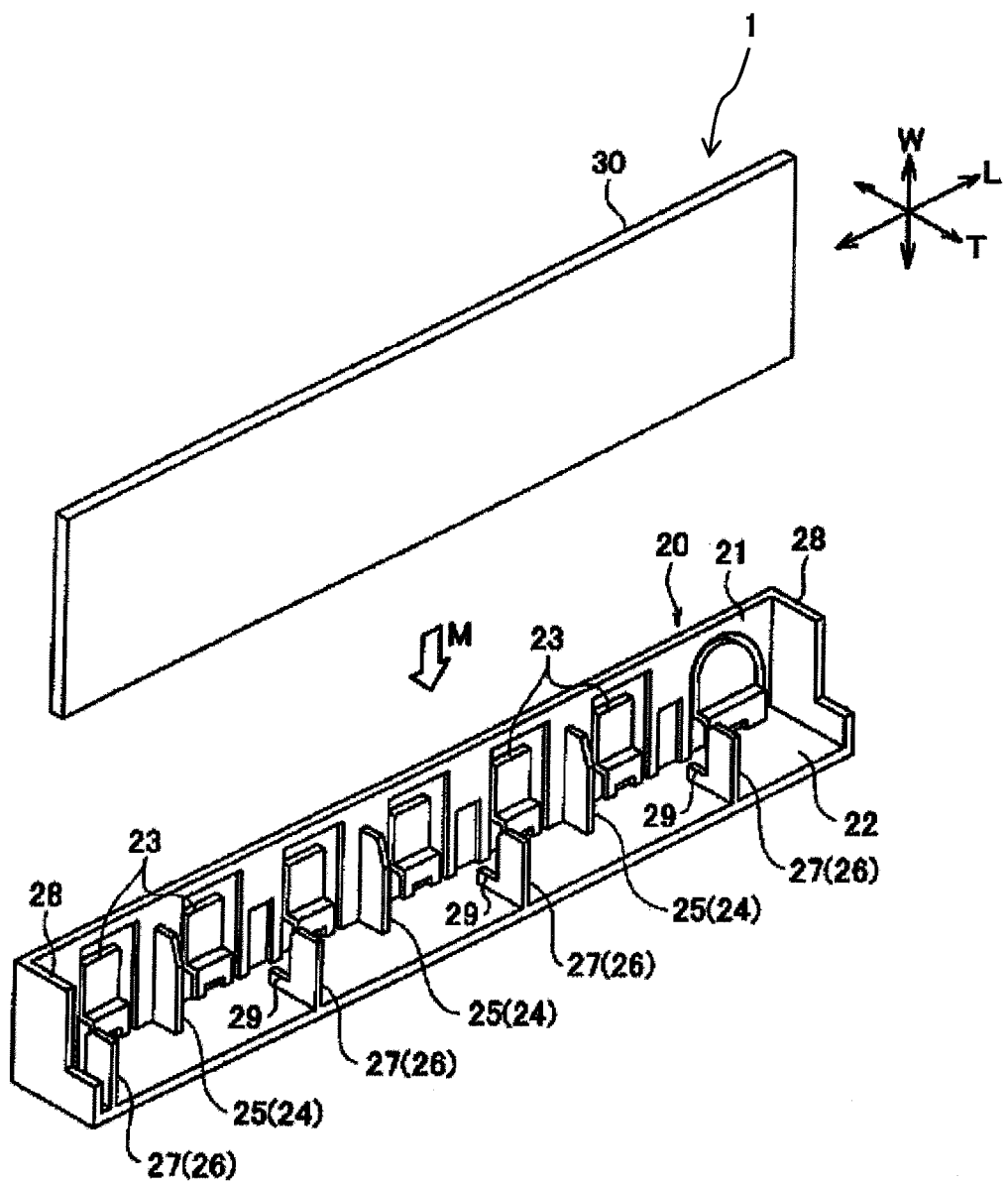
FIG. 1 is an exploded perspective view of a control key unit in accordance with one embodiment of the present invention as viewed from a back side of the control key unit.
Figure 2:
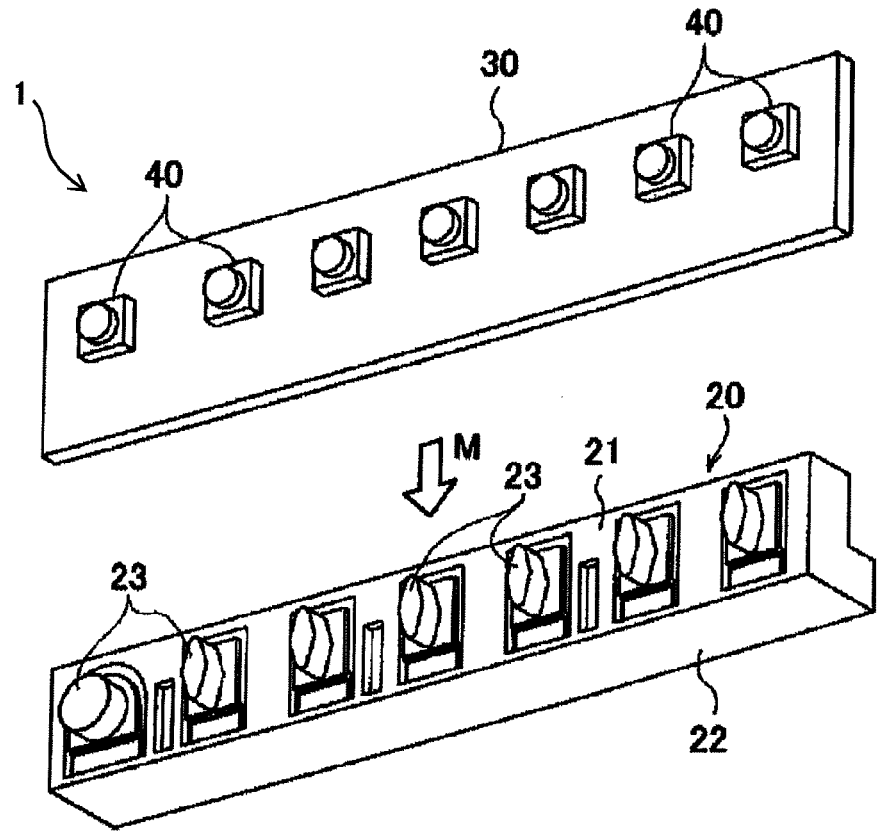
FIG. 2 is an exploded perspective view of the control key unit illustrated in FIG. 1 as viewed from a front side of the control key unit.

As shown in FIGS. 1 and 2, the frame 20 has a front panel 21 and a bottom plate 22. The bottom plate 22 extends from one width end portion in a width direction of the front panel 21 towards a back side of the frame 20. The front panel 21 has pushable key tops (e.g., push operated key tops) 23 at a plurality of places in a lengthwise direction of the front panel 21. The frame 20 is made of resin, and is integrally formed as a one-piece, unitary member.

The key tops 23 are pressed by the user to set various modes. The key tops 23 extends through openings made at a plurality of locations of a side panel 12 of the front cabinet 11. The openings are aligned vertically in the side panel 12 located on one side of the front cabinet 11. The key tops 23 include a main power button, channel changing buttons, volume adjusting buttons, an external power switchover button, setup buttons, and other such necessary control buttons. With the control key unit 1, the wiring board 30 is attached to the frame 20 in which the key tops 23 are integrally molded from resin.

The frame 20 further has a clamping section (e.g., clamping means), a lengthwise positioning section (e.g., lengthwise positioning means) and a widthwise positioning section (e.g., widthwise positioning means). The clamping section has a first rib array 24 and a second rib array 26. The first rib array 24 has a plurality of first ribs 25. The first ribs 25 are spaced apart each other at a specific spacing. The second rib array 26 has a plurality of second ribs 27. The second ribs 27 are similarly spaced apart each other at a specific spacing. The first ribs 25 are aligned in the lengthwise direction of the frame 20 at an inside corner formed by the front panel 21 and the bottom plate 22. Specifically, the first ribs 25 extend from the front panel 21 along the bottom plate 22 towards the back side of the frame 20. The second ribs 27 are aligned in the lengthwise direction of the frame 20. The second ribs 27 extend from the bottom plate 22 in a width direction W of the wiring board 30. The first and second ribs 25 and 27 are arranged in a zigzag pattern with respect to each other in the lengthwise direction L of the wiring board 30. Specifically, the first ribs 25 are formed at locations spaced apart from the second ribs 27 in the lengthwise direction L of the wiring board 30. When the wiring board 30 is attached to the frame 20, the first ribs 25 are located at a front side of the wiring board 30, and the second ribs 27 are located at a back side of the wiring board 30. Furthermore, the spacing between the first ribs 25 and the second ribs 27, or more specifically, the spacing between the first rib array 24 and the second rib array 26 in the width direction of the bottom plate 22, is set wide enough that the wiring board 30 can be inserted under light pressure from the first ribs 25 and the second ribs 27. More specifically, the spacing is set to the same as or slightly narrower than the thickness of the wiring board 30.

Also, the frame 20 has a pair of end plates 28. The end plates 28 serves as the lengthwise positioning section for positioning the wiring board 30 in a lengthwise direction L of the wiring board 30. The end plates 28 are integrally formed with the front panel 21 and the bottom plate 22 at two ends of the frame 20 in the vertical direction.

Each of the second ribs 27 of the frame 20 has a board receiver (e.g., step portion) 29. The rear cabinet 15 of the cabinet 10 further has retainer ribs 51. The board receivers 29 and the retainer ribs 51 serve as the lateral positioning section for positioning the wiring board 30 in the width direction W of the wiring board 30. The board receivers 29 are formed as a stepped part on the second ribs 27. Specifically, the board receivers 29 extend from the The width direction of the front panel 21 is parallel to the width direction W of the wiring board 30 attached to the frame 20. The lengthwise direction of the front panel 21 (or the frame 20) and the vertical direction is parallel to the lengthwise direction L of the wiring board 30 attached to the frame 20. The width direction of the bottom plate 22 is parallel to the thickness direction T of the wiring board 30 attached to the frame 20. Furthermore, the width direction W is perpendicular to the lengthwise direction L, and the thickness direction T is perpendicular to both of the width direction W and the lengthwise direction L.

As shown in FIG. 6, the cabinet 10 of the television receiver is split into the front cabinet 11 and the rear cabinet 15, which are joined together. When the control key unit 1 is attached to the front cabinet 11, the front panel 21 of the frame 20 is opposite the side panel 12 of the front cabinet 11. Furthermore, the key tops 23 provided to the front panel 21 of the frame 20 extend through vertically oriented openings formed at a plurality of places in the side panel 12. It is possible to select screw fastening or some other suitable known means for attaching the control key unit 1 to the front cabinet 11. Conventional attachment structure can be applied as this attachment means. Therefore, the detailed explanation of the attachment means is omitted.

Figure 3:
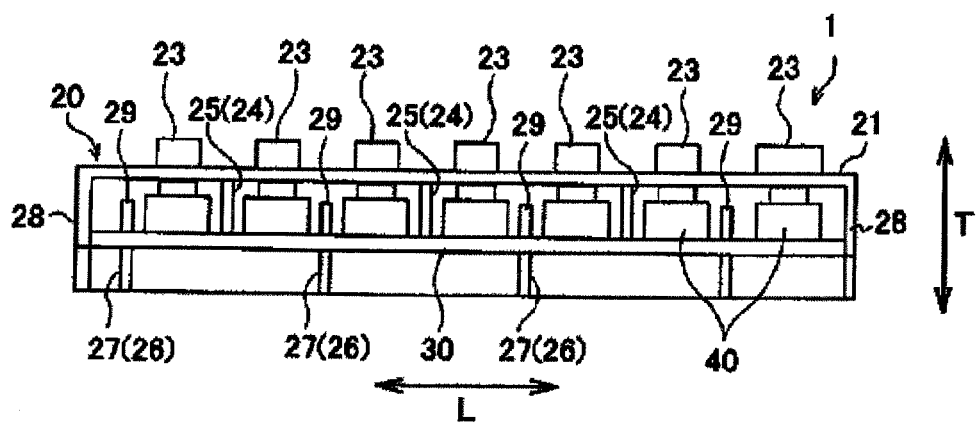
FIG. 3 is a side view of the control key unit illustrated in FIG. 1.
Figure 4:
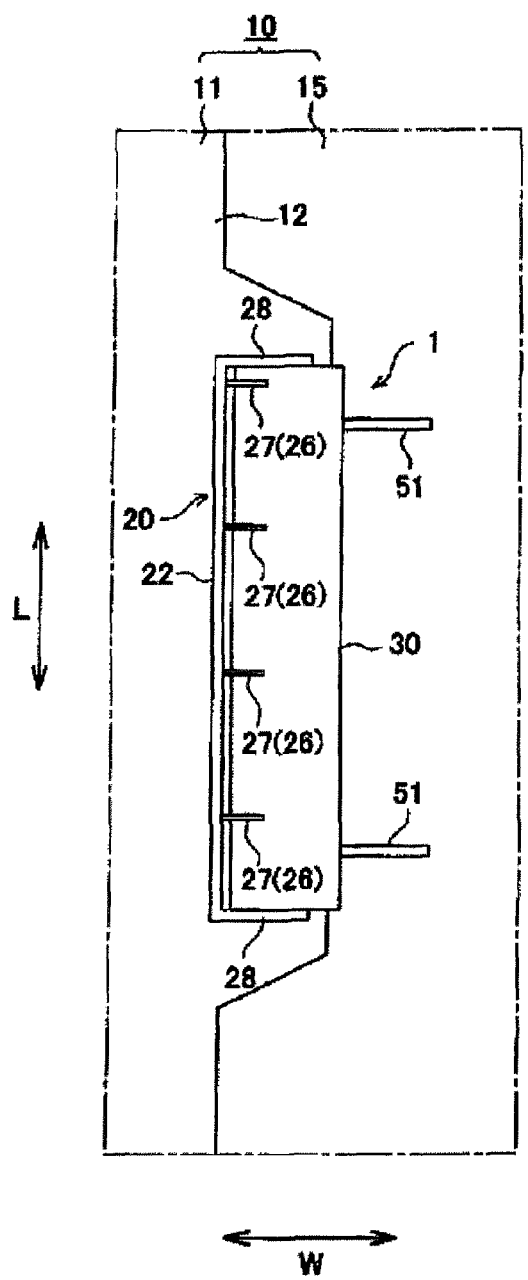
FIG. 4 is a rear view of the control key unit illustrated in FIG. 1.

As shown in FIG. 3, with the control key unit 1, the wiring board 30 is inserted into and clamped in the space between the first rib array 24 and the second rib array 26 provided to the frame 20. Accordingly, the wiring board 30 is positioned with respect to the frame 20 in the thickness direction T of the wiring board 30. Displacement in the lengthwise direction L of the wiring board 30 with respect to the frame 20 is restricted by the end plates 28 located on both lengthwise sides of the frame 20 in the lengthwise direction L of the wiring board 30. Furthermore, the wiring board 30 is clamped in the width direction W of the wiring board 30 between the board receivers 29 and the retainer ribs 51. Therefore, the wiring board 30 is positioned with respect to the frame 20 in three mutually perpendicular axial directions of the wiring board 30. Furthermore, when the wiring board 30 is positioned with respect to the frame 20, the key switches 40 mounted on the wiring board 30 are reliably positioned behind the key tops 23 provided to the front panel 21 of the frame 20. Specifically, the key switches 40 are positioned on the back side of the key tops 23. In other words, the key tops 23 overlie the key switches 40. Consequently, when one of the key tops 23 is pressed, the key switch 40 is reliably switched on and off by the key top 23.

Also, as indicated by the arrow M in FIGS. 1 and 2, when the wiring board 30 is inserted and clamped in the space between the first rib array 24 and the second rib array 26, the first ribs 25 of the first rib array 24 elastically press on one side (or the front side) of the wiring board 30, and the second ribs 27 of the second rib array 26 elastically press on the other side (or the back side) of the wiring board 30. Thus, the flatness of the wiring board 30 is maintained accurately. This action is even more pronounced since the first ribs 25 and the second ribs 27 are arranged in a zigzag pattern in the lengthwise direction L of the wiring board 30.

Figure 5:
FIG. 5 illustrates a state in which a wiring board is warped.

Accordingly, even if warping or bending deformation should occur in the wiring board 30 before it is inserted into the space between the first rib array 24 and the second rib array 26, as indicated by the solid lines in FIG. 5, this deformation can be corrected by attaching the wiring board 30 to the frame 20, as indicated by the long dashed double-short dashed lines in FIG. 5. Specifically, the deformation can be corrected when the wiring board 30 is clamped by the first rib array 24 and the second rib array 26. Consequently, the spacing becomes all even between the key switches 40 mounted on the wiring board 30 and the key tops 23 corresponding to the individual key switches 40, respectively. As a result, when the user presses the key tops 23, not only is the operational stability of the key switches 40 improved, but the tactile feedback when the key tops 23 are pressed and the key switches 40 operated is consistent over all of the key tops 23, which improves operational quality.

With the control key unit 1, the bottom plate 22 is provided to the frame 20, and the second rib array 26 is raised up on the bottom plate 22. However, it is also possible for the second rib array 26 to be formed integrally from resin so as to be contiguous with the first rib array 24. If this is done, the bottom plate 22 does not necessarily have to be provided to the frame 20. Also, the board receivers 29 do not necessarily have to be provided to all of the second ribs 27. The board receivers 29 can only be provided to some of the second ribs 27. Furthermore, it is possible for the board receivers 29 to be provided to some or all of the first ribs 25.

With the control key unit 1, the wiring board 30 is attached to the frame 20 merely by clamping the wiring board 30 in the thickness direction T of the wiring board 30 by the clamping section provided to the frame 20. Accordingly, there is no need to use screws to attach the wiring board 30 to the frame 20. In addition, the wiring board 30 is clamped and positioned in the thickness direction T of the wiring board 30 by the clamping section, is positioned in the lengthwise direction T by the action of the lengthwise positioning section, and is positioned in the width direction W by the action of the lateral positioning section. Thus, the wiring board 30 is attached to the frame 20 very accurately in three mutually perpendicular axial directions of the wiring board 30. Furthermore, the wiring board attachment structure can be simplified.

With the control key unit 1, the clamping section includes the first rib array 24 and the second rib array 26. The first rib array 24 has the first ribs 25 that contact with the front side of the wiring board 30 at a plurality of places in the lengthwise direction L of the wiring board 30. The second rib array 26 has the second ribs 27 that contact with the back side of the wiring board 30 at a plurality of places in the lengthwise direction of the wiring board 30. The second rib array 26 works together with the first rib array 24 to clamp the wiring board 30 therebetween. With the control key unit 1, the first rib array 24 and the second rib array 26 that clamp the wiring board 30 in the width direction W is integrally molded from resin along with the frame 20. Accordingly, there is no need for extra components, and the cost can be reduced correspondingly.

With the control key unit 1, the first ribs 25 and the second ribs 27 are arranged in a zigzag pattern in the lengthwise direction L of the wiring board 30. With this constitution, the first and second ribs 25 and 27 contact with different places in the lengthwise direction L of the wiring board 30. Thus, even if warping, bending, or other deformation should occur in the wiring board 30, this deformation can be effectively corrected merely by inserting and clamping the wiring board 30 between the first rib array 24 and the second rib array 26.

With the control key unit 1, the lengthwise positioning section is provided to the frame 20. The lengthwise positioning section has the end plates 28 that face the two ends of the wiring board 30 positioned with respect to the frame 20. This allows the end plates 28 to be formed from resin integrally with the frame 20. Accordingly, there is no need for extra components to position the wiring board 30 in the lengthwise direction L of the wiring board 30, and the cost can be reduced correspondingly.

With the control key unit 1, the lateral positioning section has the board receivers 29 and the retainer ribs 51. The board receivers 29 are formed as a stepped part in either the first ribs 25 or the second ribs 27. The retainer ribs 51 are provided to the cabinet 10 and press the wiring board 30 in the width direction W against the board receivers 29 when the front and rear cabinets 11 and 15 are attached together. With this constitution, the retainer ribs 51 can be integrally formed from resin along with the rear cabinet 15 of the cabinet 10. Accordingly, there is no need for extra components to position the wiring board 30 in the width direction W of the wiring board 30, and the cost can be reduced correspondingly.

With the control key unit 1, the cabinet 10 of the television receiver is divided into the front cabinet 11 and the rear cabinet 15. The frame 20 is attached to the front cabinet 11. The retainer ribs 51 are attached to the rear cabinet 15. With this constitution, after the control key unit 1 has been attached to the front cabinet 11, the wiring board 30 is positioned in the width direction W of the wiring board 30 merely by carrying out the cabinet assembly process in which the rear cabinet 15 is coupled with the front cabinet 11. Accordingly, an advantage is that there is no need to change the cabinet assembly process that was commonly performed in the past.

As discussed above, with the control key unit 1 and the television receiver, the screw fastening step can be eliminated from the process of assembling the control key unit 1 of the television receiver. Thus, productivity is improved correspondingly. Also, even if warping, bending, or other deformation should occur in the wiring board 30, this deformation is corrected merely by attaching the wiring board 30 to the frame 20 without using any screws. Thus, the operation of the key switches 40 mounted on the wiring board 30 by pressing the push buttons does not become unstable. Furthermore, the tactile feedback to the user when the push buttons are pressed is consistent. As a result, the overall operational quality of the electrical device can be improved.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a television receiver equipped with the present invention. Accordingly, these terms, as utilized to describe the present invention should be interpreted relative to a television receiver equipped with the present invention as used in the normal operating position.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A control key unit for a television receiver, comprising:
a rectangular wiring board,
a key switch disposed on the wiring board and electrically coupled to the wiring board and
a frame configured to be attached to a cabinet of the television receiver and supporting the wiring board with the frame being integrally formed as a one-piece, unitary member, and the frame including
a front panel having a push operated key top overlying the key switch,
a clamping section clamping the wiring board in a thickness direction of the wiring board, the clamping section positioning the wiring board in the thickness direction with respect to the frame,
a lengthwise positioning section positioning the wiring board in a lengthwise direction of the wiring board with respect to the frame with the lengthwise direction being perpendicular to the thickness direction, and
a lateral positioning section positioning the wiring board in a width direction of the wiring board with respect to the frame with the width direction being perpendicular to both the thickness direction and the lengthwise direction,
the lengthwise positioning section of the frame further including a pair of end plates of the frame, the end plates facing lengthwise end portions of the wiring board in the lengthwise direction of the wiring board, respectively,
the clamping section of the frame including
a plurality of first ribs that is aligned in the lengthwise direction of the wiring board, the first ribs contacting with a front side of the wiring board at locations aligned in the lengthwise direction of the wiring board, and
a plurality of second ribs that is aligned in the lengthwise direction of the wiring board, the second ribs contacting with a back side of the wiring board at locations aligned in the lengthwise direction of the wiring board, the first and second ribs clamping the wiring board therebetween,
the first and second ribs being arranged in a zigzag pattern with respect to each other in the lengthwise direction of the wiring board.

2. The control key unit according to claim 1, wherein the first ribs are formed at locations spaced apart from the second ribs in the lengthwise direction of the wiring board.

3. A television receiver comprising:
a cabinet; and
a control key unit attached to the cabinet, the control key unit having
a rectangular wiring board,
a key switch disposed on the wiring board and electrically coupled to the wiring board, and
a frame attached to the cabinet and supporting the wiring board relative to the cabinet with the frame being integrally formed as a one-piece, unitary member, and the frame including
a from panel having a push operated key top overlying the key switch,
a clamping section clamping the wiring board in a thickness direction of the wiring board, the clamping section positioning the wiring board in the thickness direction with respect to the frame,
a lengthwise positioning section positioning the wiring board in a lengthwise direction of the wiring board with respect to the frame with the lengthwise direction being perpendicular to the thickness direction, and
a lateral positioning section positioning the wiring board in a width direction of the wiring board with respect to the frame with the width direction being perpendicular to both the thickness direction and the lengthwise direction,
the lengthwise positioning section of the frame further including a pair of end plates of the frame, the end slates facing lengthwise end portions of the wiring board in the lengthwise direction of the wiring board, respectively,
the clamping section of the frame including
a plurality of first ribs that is aligned in the lengthwise direction of the wiring board, the first ribs contacting with a front side of the wiring board at locations aligned in the lengthwise direction of the wiring board, and a plurality of second ribs that is aligned in the lengthwise direction of the wiring board, the second ribs contacting with a back side of the wiring board at locations aligned in the lengthwise direction of the wiring board, the first and second ribs clamping the wiring board therebetween, the first and second ribs being arranged in a zigzag pattern with respect to each other in the lengthwise direction of the wiring board.

4. The television receiver according to claim 3, wherein the lateral positioning section of the frame further includes a plurality of step portions of the frame, the step portions being formed on either the first ribs or the second ribs, the step portions clamping the wiring board in the width direction of the wiring board between the step portions and a plurality of retainer ribs that is provided to the cabinet.

5. The television receiver according to claim 4, wherein the cabinet includes a front cabinet and a rear cabinet, the frame being attached to the front cabinet, the retainer ribs of the cabinet being formed on the rear cabinet.

* * * * *